United States Patent [19]

Marlin

[11] Patent Number: 5,298,713
[45] Date of Patent: Mar. 29, 1994

[54] PROCESS FOR WELDING THERMOPLASTIC MATERIALS WITH PROJECTION OF HOT GAS

[75] Inventor: Pascal Marlin, Cambes En Plaine, France

[73] Assignees: L'Air Liquide, Societe Anonyme Pour L'Etude et L'Exploitation Des Procedes Georges; La Soudure Autogene Francaise, Paris, France

[21] Appl. No.: 900,986

[22] Filed: Jun. 18, 1992

[30] Foreign Application Priority Data

Jun. 25, 1991 [FR] France ................ 91 07768

[51] Int. Cl.$^5$ ............................................ B23K 10/00
[52] U.S. Cl. ..................... 219/121.46; 219/121.45; 219/121.59; 156/244.14; 156/304.6
[58] Field of Search ............ 219/121.45, 121.46, 219/121.59; 427/34, 40; 156/244.15, 244.25, 285, 304.6, 290, 244.14, 145, 244.11

[56] References Cited

U.S. PATENT DOCUMENTS

| | | |
|---|---|---|
| 2,220,545 | 11/1940 | Reinhardt . |
| 2,423,237 | 7/1947 | Haslacher . |
| 2,786,511 | 3/1957 | Reid . |
| 3,397,815 | 8/1968 | Tench et al. . |
| 3,839,126 | 10/1974 | Haller . |
| 4,184,904 | 1/1980 | Gaffney ............ 156/244.15 |
| 5,108,780 | 4/1992 | Pitt et al. ............ 156/272.6 |

FOREIGN PATENT DOCUMENTS 3609775 11/1986 Fed. Rep. of Germany .
2099427 3/1972 France .

OTHER PUBLICATIONS

Patent Abstracts of Japan, vol. 9, No. 29, 59-175315, "Method of Uniting Fiber Reinforced Resin Material", Oct. 2, 1984.

Primary Examiner—Mark H. Paschall
Attorney, Agent, or Firm—Curtis, Morris & Safford

[57] ABSTRACT

The process of welding at least two elements of thermoplastic materials includes the step of heating, for projection on the welding area, a flow of projection gas comprising at least 20% helium, the balance consisting of a neutral gas or a mixture of neutral gases. For welding applications with a welding strand, the projection gas is heated at a temperature between 200° and 350° C. For applications involving the production of filamentary windings, the projection gas is heated at a temperature higher than 1000° C.

10 Claims, 1 Drawing Sheet

PROCESS FOR WELDING THERMOPLASTIC MATERIALS WITH PROJECTION OF HOT GAS

BACKGROUND OF THE INVENTION a) Field of the Invention

The present invention concerns processes for welding at least two elements of thermoplastic material including the step of projecting on the welding zone a neutral projection hot gas.

b) Description of Prior Art

A process of this type is described in the document U.S. Pat. No. 2,220,545.

In practice, for welding processes of this type, there are today two large families of processes:

the processes of welding with torch and with an extrusion welder, carried out with material input and electrical heating. In these manual processes at slow welding speed, the gas which is projected is known to be compressed air;

the processes of welding by production of hot gas with a flame, generally used without material input and for high speed applications (a few meters/minute) essentially for the formation of filamentary windings. As a result of the use of combustible gases and the production of flames, this process should be used in security premises and is not suitable for operations in situ or in environments presenting risks of deflagration.

SUMMARY OF INVENTION

It is an object of the present invention to provide improvements to the various processes of welding above mentioned, enabling to increase welding speeds while preserving the mechanical characteristics of the welded joint, eliminating risks of oxidation of the materials treated and enabling to operate under conditions of total security, while requiring simplified gas storage means, and suitable for example for interventions in situ, including in dangerous environments.

For this purpose, according to a characteristic of the invention, the projection gas comprises at least 20% helium, typically at least 30%, preferably at least 90%, the balance consisting of a neutral gas or a mixture of neutral gases, typically nitrogen and/argon.

According to a more specific characteristic of the invention, for assembling elements with a welding strand, the projection gas is heated at a temperature between 200° and 350° C., for example by electrical means.

According to another characteristic of the invention, for the production of filamentary windings, the projection gas is heated at a temperature higher than 700° C., typically higher than 1000° C., for example by means of a plasma or a solar furnace.

BRIEF DESCRIPTION OF DRAWINGS

Other characteristics and advantages of the present invention will appear from the description which follows of embodiments given by way of illustration but without limitation, with reference to the annexed drawings, in which.

DESCRIPTION OF PREFERRED EMBODIMENTS

Figure 1:
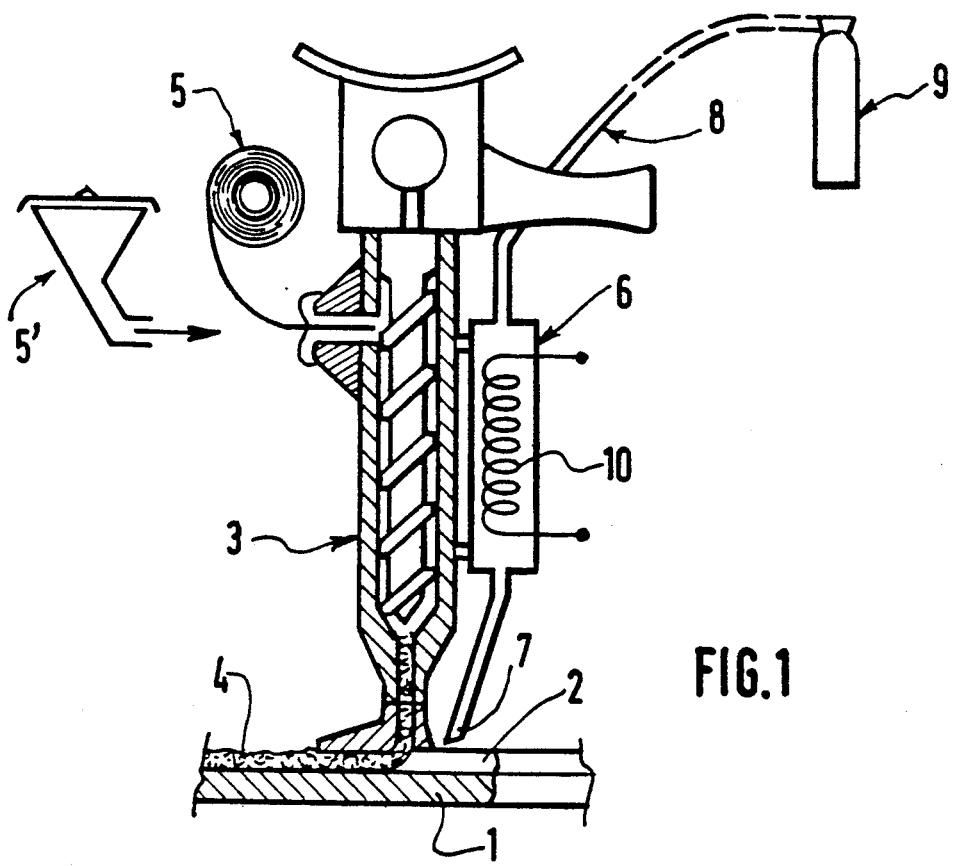
FIG. 1 is a schematic view of a device for extrusion welding utilizing the process according to the invention.

In the description which follows and in the drawings, identical or analogous elements are represented by the same reference numerals, possibly indexed.

In FIG. 1, there is a welder by extrusion of a strand, for example for the end mounting of plates 1 and 2 of a thermal plastic material such as polyolefins, PVC, PVDF or certain PTFE. The welder typically comprises an extruder body 3 delivering, at the joint between plates 1 and 2, a strand of weld 4 of the same thermoplastic material as the plates 1 and 2, originating from a coil of strand 5 or a container of granular material 5'. To the body of the extruder 3 there is associated a heating chamber 6 connected to a nozzle 7 for projecting a hot gas upstream of the pad of the extruder 3 and fed through a channel 8, from a gas container under pressure 9. According to the invention, the gas in the container 9 and projected by nozzle 7 comprises at least 20% helium, the balance being a neutral gas or a mixture of neutral gases such as nitrogen and/or argon. In this embodiment, the gas is heated in chamber 6 by means of electrical resistance which is connected to the power supply for feeding the extruder, to be heated at a temperature between 200° and 350° C. depending on the thermoplastic materials to be assembled and the flow of gas which is typically between 3 $m^3$/hour and 30 $m^3$/hour, depending on the helium content. The best performances are obtained with a gas consisting of pure helium, however significant performances are obtained with 20% helium, the range of 30 to 50% helium being a particularly economical range.

Figure 2:
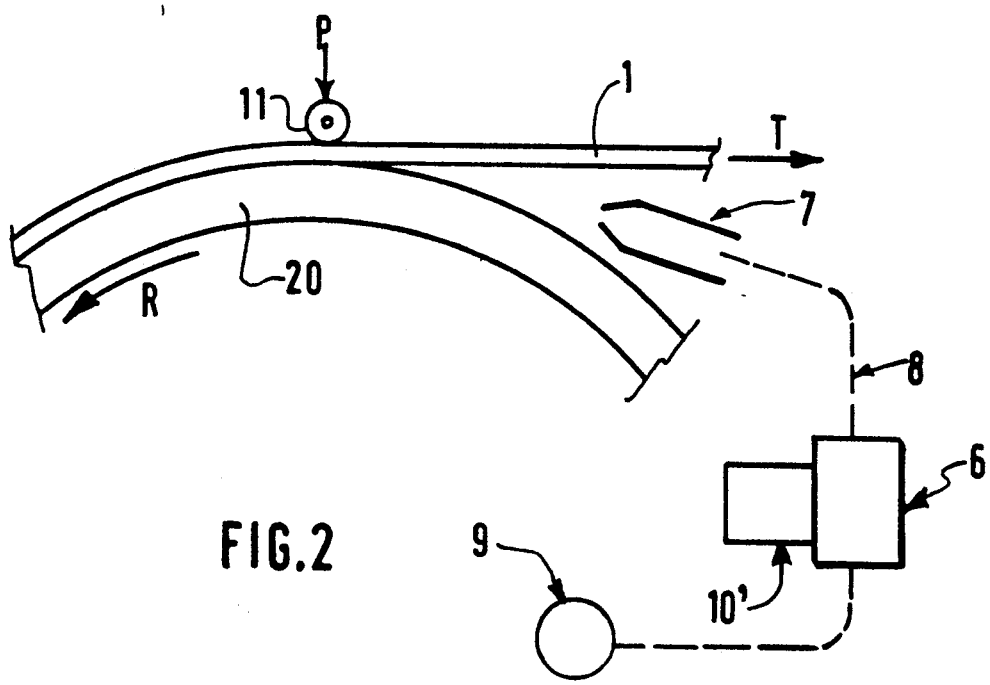
FIG. 2 is a schematic view of a welding device for the formation of filamentary windings for carrying out the process according to the invention.

In the process according to FIG. 2, which is more particularly suitable for the production of reinforced tubular members or containers, a cylindrical element to be coated or an extractable mandrel 20 is peripherally coated with a plurality of layers of filamentary windings by means of a ribbon 1 consisting of a layer of long reinforcing fibers in a matrix of technical thermoplastic material, such as polyamide or polyethers.

The article to be coated 20, generally initially coated with a plastic sub-layer, is provided with a transfer movement according to arrow R and the strand 1 is applied, according to reversed angles to form a coil, while undergoing a traction T in the direction opposite the displacement R, possibly with application of a welding pressure P, for example by means of a pressing roller 11. The projection nozzle 7 is arranged for projecting a high temperature gas on the welding area between strand 1 and article 20. According to the invention, the projection gas, originating from a container or a gas storage under pressure 9, comprises, as previously, at least 20% helium, the balance consisting of a neutral gas or a mixture of neutral gases, the helium content, for this type of applications being advantageously, higher than 80%, typically higher than 90%. The gas, supplied through channel 8, passes through heating chamber 6 where it is heated at a temperature higher than 700° C., in practice higher than 1000° C., preferably higher than 2000° C., preferably by means of a plasma generator (10'), advantageously helium-argon utilizing the gas in container 9, or in desert areas, by means of a solar furnace. The flow of gas projected is between 1 and 30 $m^3$/hour depending on the temperature available in the heating chamber 6.

Although the present invention has been described with reference to a specific embodiment, it is not limited thereto, but on the contrary, it is capable of modifications and variants which will appear to one skilled in the art.

We claim:

1. A method of welding together at least two elements of thermo-plastic material along at least a welding area, comprising the steps of:

forming a mixture of neutral gases comprising at least 20% helium;

causing the gas mixture to circulate as a stream through a gas circuit terminating at an injection nozzle;

heating the gas stream to a temperature not lower than 200° C., while circulating the stream along the gas circuit; and directing the heated gas stream ejected by the nozzle onto the welding area to heat locally the elements to a welding temperature.

2. The method of claim 1 for assembling end-to-end said two elements with a welding strand wherein the gas mixture is heated at a temperature between 200° and 350° C.

3. The method of claim 2, wherein the gas mixture comprises at least 30% helium.

4. The production of filamentary windings of superimposed layers of thermo-plastic materials made in accordance with the method of claim 1, wherein the gas mixture is heated at a temperature higher than 700° C.

5. The method of claim 4, wherein the gas mixture comprises at least 90% helium.

6. A method of joining together in a super-imposed relationship at least two layers of fiber-reinforced thermoplastic materials, comprising steps of:

forming a mixture of neutral gases comprising at least 20% helium;

circulating the gas mixture as a gas stream through a gas circuit terminating at an injection nozzle;

placing a first layer of fiber-reinforced thermoplastic material above a second layer of fiber-reinforced thermoplastic material leaving therebetween a confined space;

placing the injection nozzle adjacent the confined space;

heating the gas stream to a temperature not less than 700° C. while circulating the stream along the gas circuit;

directing the heated gas stream ejected by the nozzle into the confined space to heat locally the first and second layers to a welding temperature, and coating said second layer with said first layer upon the application of pressure.

7. The method of claim 6, wherein said first and second layers are successively wound around a central core.

8. The method of claim 7, wherein the central core carrying the first layer is rotated in a direction opposite to the ejection nozzle.

9. The method of claim 7, wherein the gas mixture is heated at a temperature between 1000° and 3000° C.

10. The method of claim 9, wherein the gas mixture comprises at least 90% helium.

* * * * *